G. SMITH.
MACHINE FOR CHARGING AND DISCHARGING OVENS.
APPLICATION FILED NOV. 29, 1911.
1,038,503.
Patented Sept. 10, 1912.
5 SHEETS—SHEET 2.
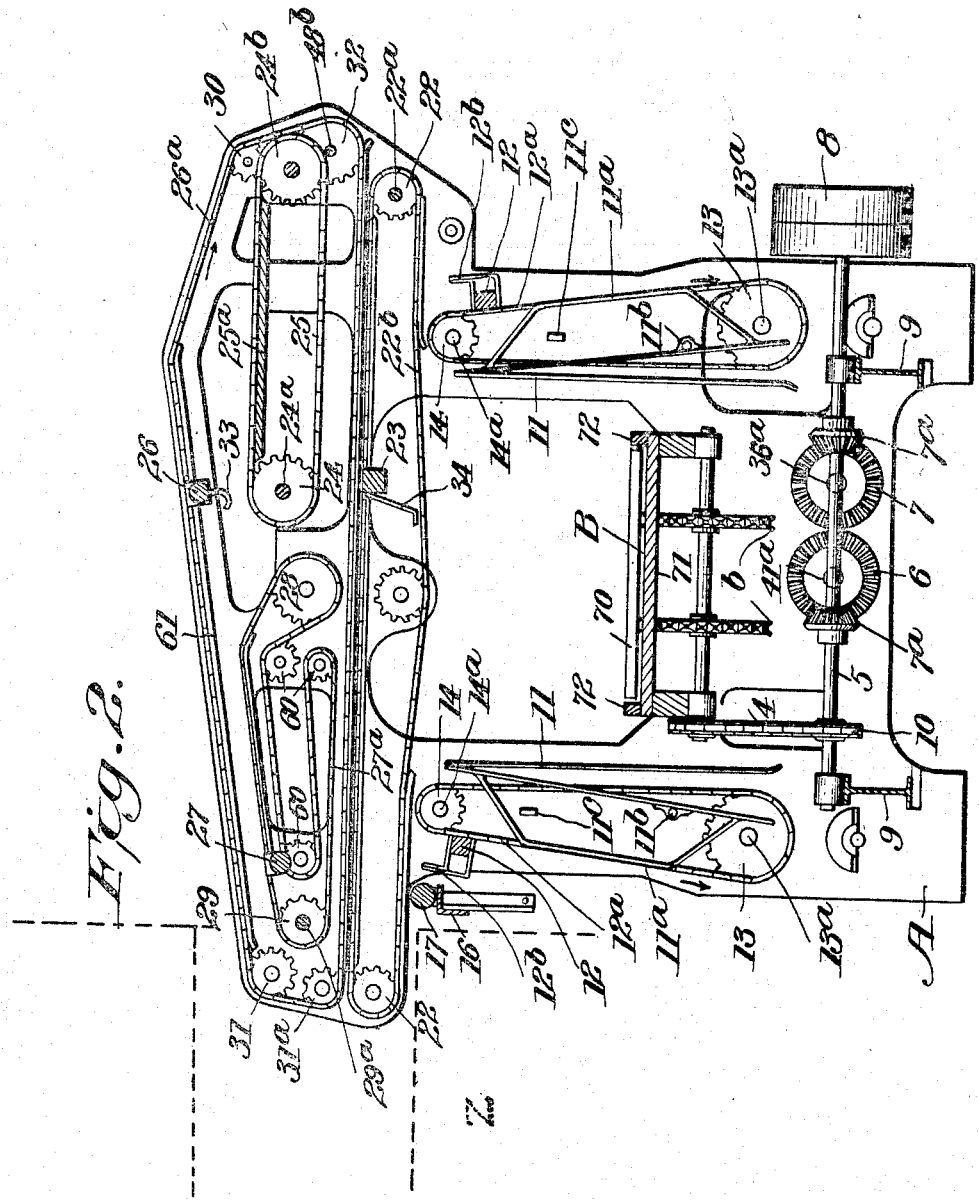
WITNESSES
INVENTOR
Attorney G. SMITH.
MACHINE FOR CHARGING AND DISCHARGING OVENS.
APPLICATION FILED NOV. 29, 1911.

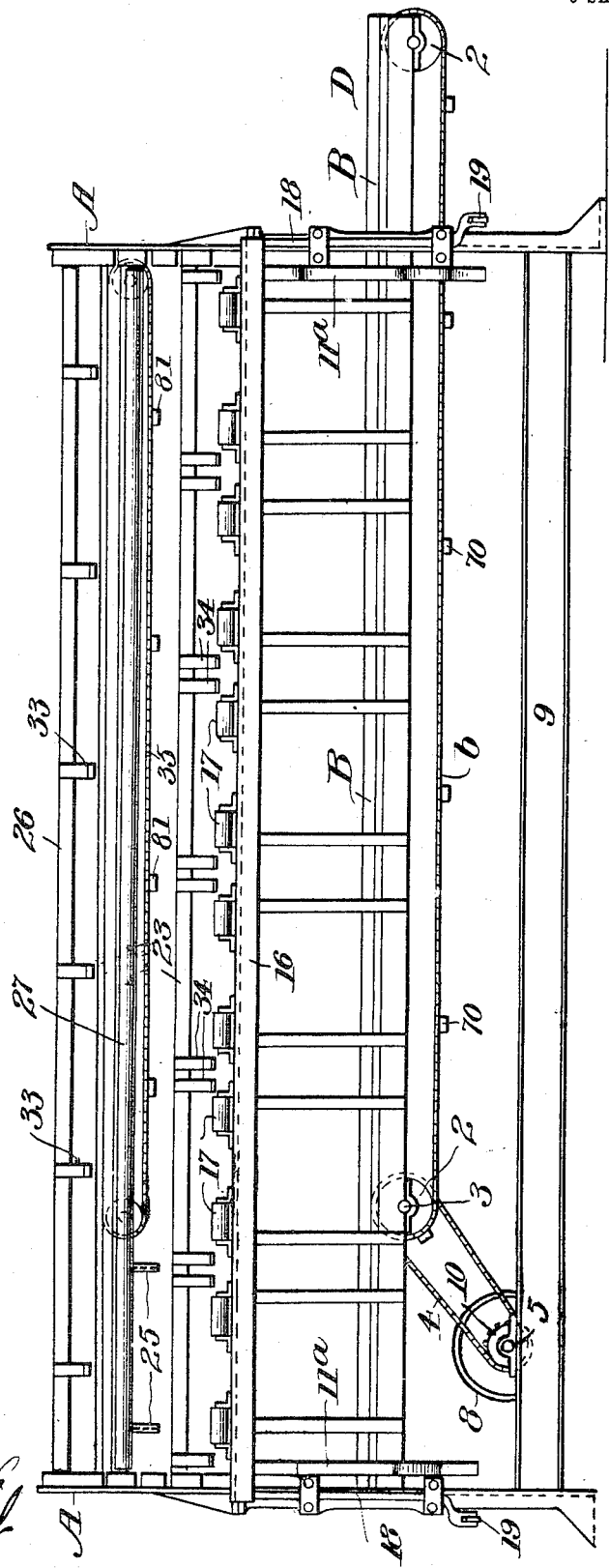

1,038,503.

Patented Sept. 10, 1912.
5 SHEETS—SHEET 3.

WITNESSES

INVENTOR

Attorney

G. SMITH.
MACHINE FOR CHARGING AND DISCHARGING OVENS.
APPLICATION FILED NOV. 29, 1911.
1,038,503.
Patented Sept. 10, 1912.
5 SHEETS—SHEET 4.
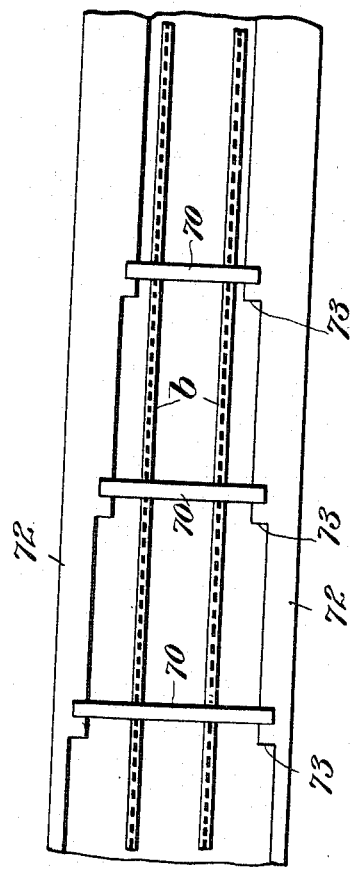
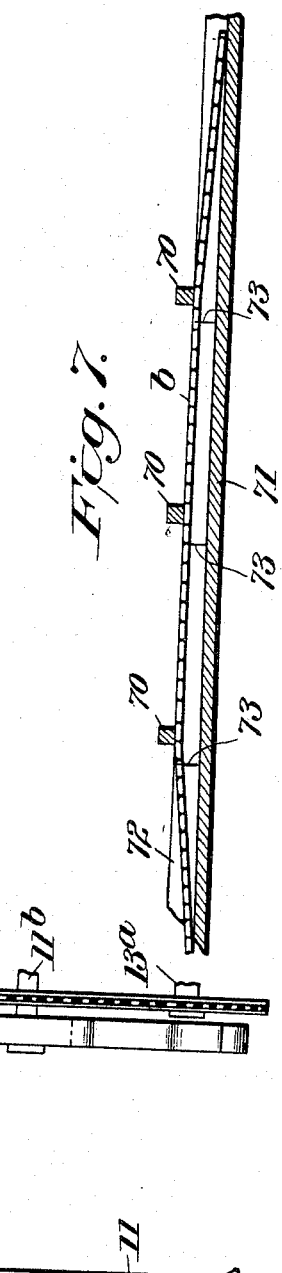
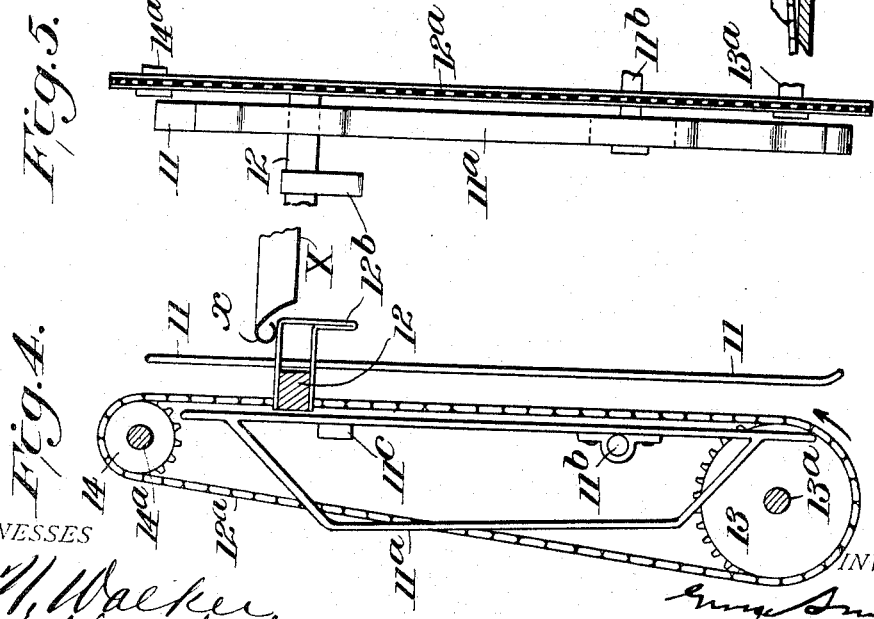
WITNESSES
INVENTOR
George Smith
Attorney

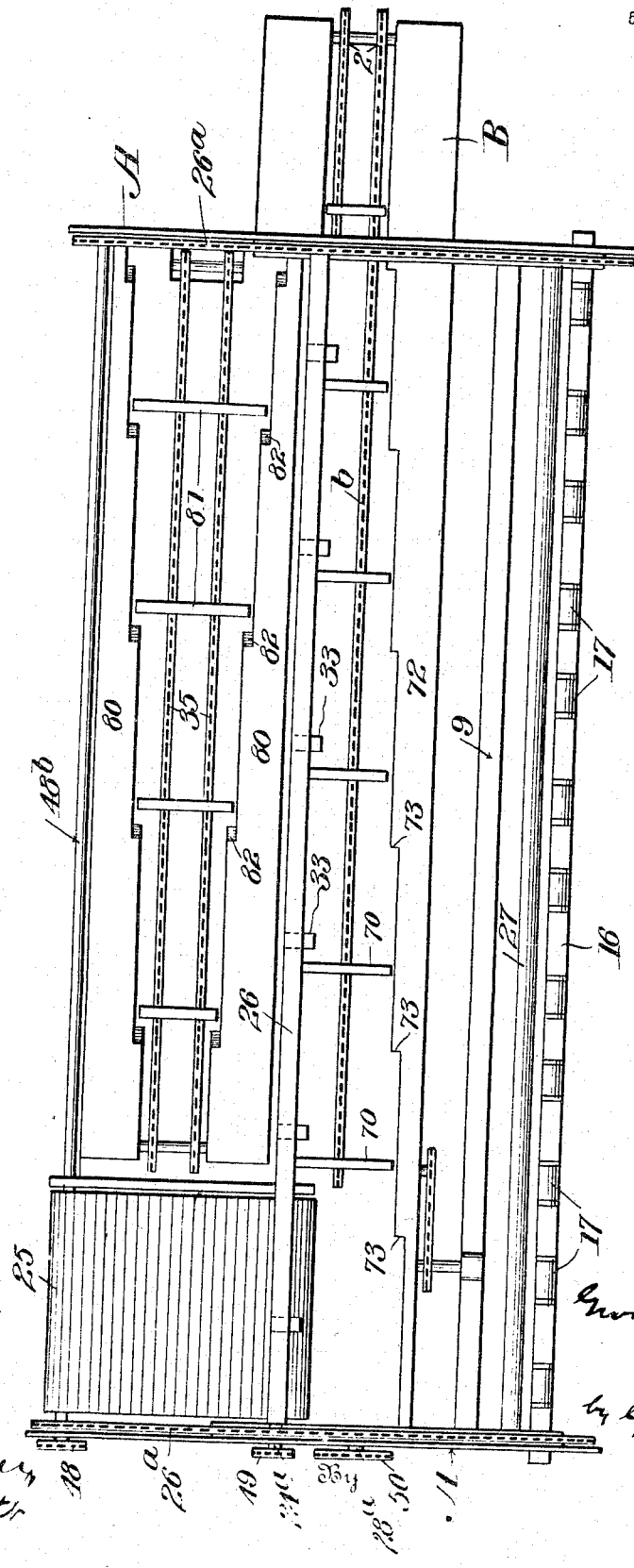

UNITED STATES PATENT OFFICE.

GEORGE SMITH, OF RICHMOND, VIRGINIA.

MACHINE FOR CHARGING AND DISCHARGING OVENS.

1,038,503.  Specification of Letters Patent.  Patented Sept. 10, 1912.

Application filed November 29, 1911.  Serial No. 663,089.

*To all whom it may concern:*

Be it known that I, GEORGE SMITH, a citizen of the United States, residing at Richmond, in the county of Henrico and State of Virginia, have invented certain new and useful Improvements in Machines for Charging and Discharging Ovens, of which the following is a specification.

This invention relates to machines for charging and discharging ovens, particularly ovens of the reel type. The machine is intended to place and withdraw bake pans from the oven without the necessity for manual operation within the oven.

The machine comprises a frame in the lower part of which is a horizontal conveyer moving from one end to the other, to carry a row of pans into the machine; an elevating device which lifts the pans from the conveyer into position in front of the oven door; means for advancing the pans so lifted to shift or place the same in the oven; and means for withdrawing the pans from the oven and delivering the same to a conveyer from which they are removed by the attendant.

The object of the invention is to provide an improved machine for the purpose stated.

In the accompanying drawings—Figure 1 is a front elevation of the machine. Fig. 2 is a vertical cross section showing the machine applied to an oven door. Fig. 3 is a left end view. Figs. 4 and 5 are details of the guides for the elevator. Figs. 6 and 7 are details of the platform for the lower or feeding conveyer. Fig. 8 is a plan view of the machine.

Referring specifically to the drawings, A indicates the end frames of the machine, of proper size and shape to support the parts hereinafter described, and 9 indicates connecting beams between the end frames.

B is a feeding conveyer which projects through one end frame and which will be more particularly described hereinafter. This conveyer comprises chain belts driven by sprockets 2 on a shaft 3 which is driven by means of a belt 4 and sprocket 10 on a cross shaft 5 which has fast and loose pulleys 8 to which power is applied. Bevel gears 7ª on said shaft, which is mounted in bearings on the beams 9, drive gears 7 and 6, the shafts 36ª and 41ª of which carry sprockets 36 and 41, the former being belted to a spocket 37 and the latter to a sprocket 42 which sprockets are belted to stub shafts 13ª on which are mounted sprockets 13, said shafts being located at the ends of the machine, and at the front and back thereof respectively. These sprockets 13 are belted to upper sprockets 14, the belts being indicated at 12ª, said belts having vertical runs toward the inside of the machine. These are the elevator belts, and they carry horizontal bars 12 extending from one end of the machine to the other, said bars 12 having a series of projecting fingers 12ᵇ. The direction of travel of the belts is indicated by the arrows applied thereto, and at proper times the fingers engage under the projecting edges of pans indicated at X, on the horizontal conveyer B, to raise said pans to the top of the machine. Stationary guide strips 11, at the ends of the frame, hold the bars 12 in proper position as they go up, and this action is assisted by pivoted guides 11ª, consisting of strips which swing on pivots 11ᵇ toward and from the fixed guides 11, as shown in Figs. 4 and 5, and when the bars 12 go up their ends pass between the guides. Stops 11ᶜ act to prevent excessive outward swing of the upper ends of the swinging guides, and the bowed back pieces of the swinging guides 11ª serve to hold the bars out of the way as they are going down.

The stub shafts 14ª of the sprockets 14 are located in the upper part of the frame, and the front shafts, that is the ones nearest to the oven, each have a sprocket 45 which is connected by belt 45ª to a sprocket 46, Fig. 3, on one of two shafts 22ª which are located respectively at the opposite ends of the machine. These shafts are short stub shafts and are duplicated at opposite ends of the machine. They carry sprockets 22 connected by chains 22ᵇ with horizontal runs. To these chains are attached a bar 23 extending lengthwise of the machine, from one end to the other, and this bar has a series of depending curved fingers 34. That is, the fingers depend when the bar is at the upper run of the chains, as shown in Fig. 2, the direction of movement being such that the bar advances, on the upper run, toward the mouth of the oven, and as it advances the fingers catch behind the pans and shove them toward and into the oven, the pans at that time being elevated by the bars 12, to position where the pans will be engaged by the fingers 34, and thereby shifted from the elevator into the oven. A series of rollers 17 are mounted on a front cross bar 16, and the pans slide on these rollers as they are being advanced. Said bar 16 slides up and down to a limited extent, on guides 16ª at the ends. The bar is raised and lowered by reciprocating rods 18 mounted in guides on the ends of the frame, said bars being lifted in time by levers 19 fulcrumed at 21 and connected to the rods 18 by a pin and slot at 20. The levers 19 are operated by strike pins 44ª on sprockets 44 driven by belts 44ᵇ from sprockets 53 on shafts 13ª, Fig. 3, and the action is so timed that the rollers 17 will be lifted against the bottom of the pans when the pans are advanced as above described by the fingers 34.

The shaft 36ª carries a sprocket 36ᵇ, Fig. 3, which is connected by a chain belt 50ª to a sprocket 50 which turns the shaft 28ª carrying a sprocket 28 connected by chain belts 27ª at opposite ends of the machine to sprockets 29 on a shaft 29ª at the front of the machine. The chains 27ª pass intermediately around the guide sprockets or idle wheels 60 for proper timing and position, and these chains 27ª carry a roll 27 extending lengthwise between the ends of the machine, and which assists in the discharging action to be described.

A sprocket 48 is connected by a belt 48ª to a driving sprocket 38, on shaft 37ª, and the sprocket 48 is mounted on the shaft 48ᵇ which carries sprockets 32, Fig. 2, which drive chain belts 26ª, which run around guide sprockets 30, 31 and 31ª at the back and front of the machine. The upper runs of the chains 22ᵇ, 26ª and 27ª are supported by guide flanges 61 on the end frames A to prevent sag.

The belts 26ª carry a longitudinal swinging bar 26 extending from end to end of the machine, and this bar has a series of depending hooks 33 adapted to engage under the wired or turned rim $x$ of the pans. The direction of travel of the belts 26ª is shown by the arrows applied thereto.

A sprocket 49, Fig. 3, is driven by belt 49ª from a sprocket 51 on the shaft 36ª, and the sprocket 49 is mounted on a shaft 24ª which carries sprockets 24. Conveyer chains 25 pass around these sprockets and also around the sprockets 24ᵇ at the rear side of the machine, said chains passing over a table 25ª mounted between the end frames, and from which the pans are removed by an attendant.

The cross conveyer 25 is located at one end of the machine only. The pan at that end is delivered directly onto that conveyer. The remaining pans of the row are advanced endwise of the machine to that conveyer, by means of conveyer belts 35 which, as shown in Fig. 8, run lengthwise of the machine, between the conveyer 25 and the opposite end, and said conveyer belts 35 act to carry the pans which are delivered thereto, to the conveyer 25, so that the attendant may take off one pan at a time from the latter. The conveyer belts 35 have attached thereto cross pieces 81 which as the belts travel toward the conveyer 25 ride up inclines 82 at the opposite edges of rails 80, onto which the pans are deposited by fingers 33, after they are pulled out of the oven, and as each cross piece 81 comes up the incline it will engage behind one of the pans constituting the row and thus advance the pans along the rails 80 and deposit the same one by one on the apron 25 from which, as stated, they are removed by an attendant. The chains 35 are driven by bevel gearing seen at 84 (Fig. 3) between the shaft 24ª and one of the shafts 85 around which the chain belts 35 pass. This action is somewhat similar to the action of the feeding conveyer B, now to be described.

The feeding conveyer B, first referred to, consists of a pair of chains which run over the sprockets 2, the chains being indicated at $b$ and attached to these chains are cross pieces 70 which are spaced apart a distance equal to or greater than the width of a pan, and which correspond in number to the number of pans in a row. These chains travel over a bed 71 which has rails or flanges 72 at opposite edges, along and upon which the pans slide. These rails are stepped at their inside edges, as indicated at 73. The cross pieces 70 correspond in length to the distance between the opposite rails at the respective steps, the longest cross bar being in advance, and the cross bars are mounted on the outer side of the chains. The pans are deposited at D on the conveyer, and as the cross bars advance they strike the pans respectively and advance the same along the rails. As each bar 70 reaches its corresponding step it drops, since the rails support the cross bars until the steps are reached. When each cross bar drops it slips beneath the pan carried thereby, leaving said pan in appropriate position on the rails. Consequently the conveyer will feed a row of pans to appropriate position on the rails, and will there leave the same.

In the operation of the machine, the pans are fed into the end of the machine on the conveyer B as above described and take position on the rails 72. At this time the bars 12 carried by the belts 12ª come around and as they rise between the guides 11 and 11ª the fingers 12ᵇ engage under the pans and lift the whole row to the top of the machine. Then the bar 23, advancing crosswise as shown in Fig. 2, catches behind the pans by means of the depending fingers 34 and forces the pans toward the oven which is indicated at Z, the machine being placed with its front edge or side in the mouth of the oven. The fingers 34 carry the pans across, and as they pass over the rollers 17 said rollers lift against the bottom of the pans which are slid or shoved thereover through the mouth of the oven and onto the carrier or reel plates in the oven, the bar 23 passing around again to the back side of the machine and clearing itself by dropping down for the backward run. Before the feeding action just described takes place, any pans which are on the carrier plate of the oven will be first withdrawn as follows: As the bar 26 comes around with its belts, the swinging hooks 33, as it passes around the sprockets 31, will project out toward the pans in the oven and will come up under the rims thereof and will hook under or catch the turned rims *x* of the pans, and engage the same and draw or drag the pans up and outwardly and at this time the roller 27, coming around with its belt on the sprockets 29, will lift or engage under the bottoms of the pans, which will then travel outwardly, being supported by said roller, and pulled along by the hooks 33, and thence, owing to the drop of the belts 27ª around the sprockets 28, the pans will be deposited on the conveyer 25 and rails 80 for removal, as above described.

The various operations are so timed that the withdrawing action will occur before the charging action, and inasmuch as the withdrawing devices are located above the charging devices the outgoing pans will be lifted out of the way of the incoming pans which will be slid in immediately after the outgoing pans are lifted, so that the operation of the oven will not be delayed very much.

Obviously the transmitting gearing, etc., will be proportioned to effect the desired result with respect to the time of operation of the various parts.

What I claim as new is:—

1. In an oven charging machine, the combination of a frame, a conveyer to advance pans into the frame, elevating devices movable up and down in the frame and adapted to lift the pans from the conveyer, and means engageable with the pans when so elevated to advance the same into the oven.

2. In an oven charging machine, the combination of a frame adapted to be placed in front of the oven, a conveyer traveling in the machine and adapted to convey pans within the same, elevating means at opposite sides of the conveyer and provided with devices engageable with opposite edges of the pans to lift the same, and means to advance the pans when so lifted into the oven.

3. In an oven charging machine, the combination of a frame adapted to be placed in front of an oven, a horizontally traveling conveyer movable in the frame and adapted to advance a row of pans into the same, elevating devices movable up and down at opposite sides of the conveyer and engageable with the pans to lift the same, and a charging device movable transversely across the frame and engageable with the pans when so elevated and adapted to advance the same into the oven.

4. In an oven charging device, the combination of a frame, a conveyer movable in the frame and provided with a series of devices engageable with pans in succession and adapted to advance the same to a certain position respectively in the frame, means to disengage said devices from the respective pans when they reach such position, means to elevate the pans from the conveyer, and means to advance the pans so elevated into the oven.

5. In an oven charging machine, the combination of a frame adapted to be placed in front of an oven, a conveyer movable horizontally in the lower part of the frame and adapted to advance a pan into the same, elevating devices movable up and down in the former and engageable with said pan to lift the same from the elevator, and means movable transversely across the frame and engageable with a pan so elevated to advance the same out of the front of the frame and into the oven.

6. In an oven charging machine, the combination of a frame, a horizontally movable conveyer in the lower part of the frame and traveling from end to end thereof and adapted to carry a row of pans into the machine, elevators movable up and down at opposite sides of the conveyer and having projections engageable with opposite edges of the pans to lift the same from the conveyer, and a device movable horizontally back and forth across the upper part of the frame and engageable with the pans so elevated, to advance the same from the conveyer and into the oven.

7. In an oven charging machine, the combination of a frame, a pair of rails extending horizontally therein and spaced apart successively increasing distances, a conveyer belt provided with cross bars of successively decreasing length which slide along said rails and drop between the same at predetermined points to advance pans to certain positions on the rails, means to lift the pans from the rails, and means to advance the pans so lifted into the oven.

8. In an oven charging machine, the combination of a frame, a pair of rails therein, said rails being stepped to provide successively increasing distances therebetween, a conveyer belt traveling between the rails, cross bars of successively decreasing length attached to the belt and adapted to travel along the rails and advance pans along the same, the length of the bars being such that they will drop at successive steps and leave the pans in predetermined positions on the rails, means to lift the pans from the rails, and means to advance the pans so lifted into the oven.

9. In an oven charging machine, the combination of a frame, a feeding conveyer in the lower part thereof, elevating devices movable up and down at opposite sides of said conveyer, and adapted to lift pans therefrom, and a bar movable transversely across the upper part of the frame and having depending projections engageable with the sides of the pans and adapted to slide the pans transversely across the frame and into the oven.

10. In an oven charging machine, the combination of a frame, a feeding conveyer in the lower part thereof, adapted to advance pans into the frame, elevating devices engageable with the pans and adapted to lift the same from the conveyer, and means to shift the pans from said elevating devices into the oven, comprising a pair of traveling belts running transversely across the frame, a bar carried by said belts and depending fingers on the bar, engageable with the pans so lifted.

11. In an oven charging machine, the combination of a frame, a feeding conveyer in the lower part thereof, adapted to advance pans into the frame, elevating devices engageable with the pans and adapted to lift the same from the conveyer, and means to shift the pans from said elevating devices into the oven, comprising a pair of traveling belts running transversely across the frame, a bar carried by said belts and depending fingers on the bar, engageable with the pans so lifted, a roller at the front of the machine, said roller being movable up and down, and means to raise the roller under the bottom of the pans as they are shifted.

12. In an oven charging machine, the combination of a frame, a traveling belt conveyer adapted to advance pans into the lower part of the frame, horizontally extending bars movable up and down at opposite sides of the conveyer and having projections engageable with the pans to lift the same, and means operating transversely across the top of the frame to engage and advance into the oven the pans so lifted.

13. In an oven charging machine, the combination of a frame, a conveyer movable horizontally in the lower part of said frame and adapted to advance pans into the same, a pair of bars movable up and down at opposite sides of said conveyer, and having projections engageable with the pans to lift the same on the upward movement of the bars, guides for said bars, and devices movable transversely across the frame, above the conveyer and engageable with the pans to shift the same transversely out of the frame and into the oven.

14. In an oven charging machine, the combination of a frame adapted to be placed in front of an oven, a horizontally traveling conveyer in the lower part of the frame, lifting bars, movable up and down at opposite sides of said conveyer and having projections engageable with the pans to lift the same from the conveyer, fixed guides at one side of said bars swinging guides at the opposite sides of said bars, and devices movable transversely across the frame above the conveyer and engageable with the pans so lifted to advance the same from the machine and into the oven.

15. In an oven charging machine, the combination of a frame, a feeding conveyer movable horizontally in the lower part thereof, elevating devices movable vertically at opposite sides of said conveyer, belts running horizontally and transversely across the frame and above the conveyer, a bar carried by said belts, and fingers projecting from bar and engageable with elevated pans and adapted to slide the same transversely across and out of the frame and into the oven.

16. The combination of a frame adapted to be placed in front of an oven, a pair of traveling belts moving transversely across the frame, a bar carried between said belts, and hooks projecting from the bar and adapted to engage the rims of pans and pull the pans from the oven.

17. The combination of a frame adapted to be placed in front of an oven, a pair of traveling belts moving transversely across the frame, a bar carried between said belts, and hooks projecting from the bar and adapted to engage the rims of pans and pull the pans from the oven, and a movable support traveling in the frame behind the bar carrying the hooks and adapted to support a pan as it is withdrawn by the hooks.

18. The combination of a frame adapted to be placed in front of the oven and having a projecting part adapted to be entered into the doorway thereof, a pair of belts running in said frame, a bar attached to the belts and extending between the same, guide wheels on said projecting part, around which the belts pass, hooks projecting from the bar and adapted to engage the rim of the pans in the oven as said belts pass around said wheels, another pair of belts traveling in the frame below the upper runs of the first mentioned belts, and a supporting bar carried by said other pair of belts and adapted to support the pans as they are withdrawn.

19. The combination of a frame adapted to be placed in front of an oven, charging devices mounted on the frame and movable toward the oven to advance pans into the same, and withdrawing devices located in the frame above the charging devices and movable toward and from the oven, and provided with means for gripping and lifting a pan and withdrawing the same from the oven above the charging devices.

20. The combination of a frame adapted to be placed in front of an oven, charging devices mounted on the frame and projecting partly into the oven when the frame is so placed, and including a pair of belts running across the frame and a pusher bar carried by said belts to advance pans into the oven, and withdrawing devices mounted in the frame above the charging devices and including a pair of belts moving across the frame, a bar carried by said belts, and hooks projecting from the bar and adapted to engage the rim of a pan and withdraw the same from the oven above the charging devices.

21. The combination of a frame, a movable carrier mounted in the frame and arranged to travel back and forth from front to rear thereon and provided with hooks for engaging and withdrawing pans from the oven, and a traveling conveyer located at the back of the frame and onto which the pans are deposited by the carrier.

22. The combination of a frame, a pair of rails extending horizontally therein and spaced apart and having opposite inclines, means to deposit pans on the rails, and a conveyer belt provided with cross bars of successively increasing length which are adapted to ride up the inclines and slide along said rails at predetermined points, to push pans along the rails.

In testimony whereof, I affix my signature in presence of two witnesses.

GEORGE SMITH.

Witnesses:
H. W. KING,
W. A. CHILDRESS.